United States Patent Office 3,306,897
Patented Feb. 28, 1967

3,306,897
THIENO-BENZOTHIOPYRAN DERIVATIVES
Jany Renz and Jean-Pierre Bourquin, Basel, Gustav Schwarb, Neualischwil, Basel-Land, and Leo Ruesch, Basel, Switzerland, assignors to Sandoz Ltd. (also known as Sandoz A.G.), Basel, Switzerland
No Drawing. Filed June 8, 1964, Ser. No. 373,503
17 Claims. (Cl. 260—240)

This invention relates to novel thieno-benzothiopyran derivatives and a process for the manufacture thereof. This application is a continuation-in-part of application Serial No. 189,709, now abandoned.

More particularly this invention relates to chemical compounds of the formula

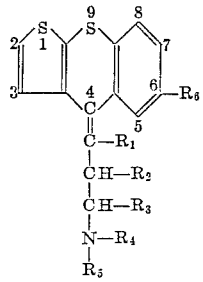

wherein $R_1$, $R_2$, $R_3$, $R_4$ and $R_5$ can be the same or different and are selected from the group consisting of hydrogen and alkyl radicals with 1 to 4 carbon atoms, or $R_4$ and $R_5$ can form together a pyrrolidine, a piperidine, a 4-alkyl-piperazine or a morpholine ring, or $R_4$ can form together with $R_1$, $R_2$ or $R_3$ a pyrrolidine or a piperidine ring, and $R_6$ is a hydrogen or chlorine atom, an alkoxy or an alkylmercapto radical.

Among the alkoxy and the alkylmercapto radicals represented by $R_6$ in the foregoing formula it is especially the lower alkoxy and lower alkylmercapto radicals which are preferred which for example are methoxy, ethoxy, propoxy, isopropoxy and methylmercapto, ethylmercapto, propylmercapto, isopropylmercapto respectively. The alkyl radicals represented by $R_1$, $R_2$, $R_3$, $R_4$ and $R_5$ in the foregoing formula also are preferred as the lower alkyl radicals, for example methyl, ethyl, propyl or isopropyl.

Equivalent to the foregoing thieno-benzothiapyran derivatives for the purposes of this invention are the corresponding acid addition salts of the formula

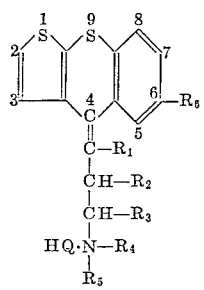

wherein $R_1$, $R_2$, $R_3$, $R_4$, $R_5$ and $R_6$ have the meanings previously assigned; Q represents one equivalent of an anion—for example chloride, bromide, iodide, sulfate, methyl sulfate, acetate, citrate, oxalate, tartrate, succinate, malate, fumarate, maleate, benzoate, gallate, or the like—which, in combination with the cationic portion of a salt aforesaid is neither pharmacologically nor otherwise undesirable in physiological dosage.

The compounds to which this invention relates are useful because of their valuable pharmacological properties. Not only are they strong antihistaminics but, additionally, they also show anticholinergic properties and work as antagonists of epinephrine and may, therefore, be used as narcosis potentiators, sedatives or antipyretics.

Manufacture of the subject compounds proceeds by dehydrating a selected 4-hydroxy-thieno-benzothiopyran of the formula

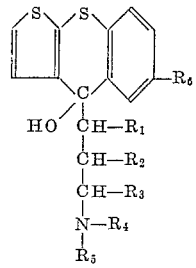

wherein $R_1$ to $R_6$ are defined as above. Dehydration may be effected with an organic acid anhydride, a phosphorus halide or oxyhalide or even merely by heating a compound as above to a temperature below its decomposition temperature. If a uniform isomer is required from any resulting isomer mixture, the thieno-benzothiopyran can be separated into their cis- and trans-isomer forms.

The 4-hydroxy-thieno-benzothiopyrans of the above formula, which are new and also form part of the present invention, may be produced by reacting a 4-oxo-thieno-benzothiopyran of the formula

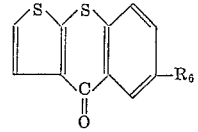

in which $R_6$ has the above significance, with an organic magnesium compound of the formula

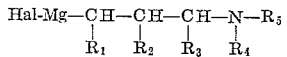

in which $R_1$ to $R_5$ have the above significance, and Hal signifies a chlorine, bromine or iodine atom, and hydrolyzing the reaction product to form the desired 4-hydroxy-thieno-benzothiopyran.

The 4-oxo-thieno-benzothiopyrans having a hydrogen or chlorine atom, an alkoxy radical containing from 1 to 4 carbon atoms inclusive (e.g. methoxy, ethoxy, propoxy, isopropoxy, butoxy or isobutoxy radical) or an alkylmercapto radical containing from 1 to 4 carbon atoms inclusive (e.g. a methyl-, ethyl-, propyl-, isopropyl-, butyl- or isobutylmercapto radical) in the 6-position, are suitable for use as starting materials, and may be produced by condensing 2-bromo-thiophene with a suitably substituted thiosalicylic acid and cyclizing the reaction product with concentrated sulphuric acid.

Of the thieno-benzothiopyrans used as starting materials in accordance with the invention those where R is other than a hydrogen or a chlorine atom are new and form part of the present invention. Specifically 6-methoxy - 4 - oxo - thieno[2,3-b][1] - benzothiopyran and 6-methylmercapto - 4 - oxo - thieno[2,3-b][1]-benzothiopyran may, for example, be produced as follows:

(a) *6-methoxy-4-oxo-thieno[2,3-b][1]-benzothiopyran*

(i) *S-(2-thienyl) - 5 - methoxy-thiosalicyclic acid.*—A mixture of 195 g. of the potassium salt of 2-mercaptothiophene, 342 g. of the potassium salt of 2-bromo-5-methoxy-benzoic acid (free acid melting point 161–162°), 25.5 g. of potassium iodide and 12.7 g. of copper bronze are heated at reflux with 1275 cc. of diethylene glycol monomethyl ether whilst stirring for 12 hours at an oil bath temperature of 220°. After completion of the reaction the mixture is concentrated in a vacuum at an oil bath temperature of 150°. The evaporation residue is taken up in 1275 cc. of water, filtered and made acid to Congo red indicator with 475 cc. of a 10% hydrochloric acid solution. The precipitated substance is filtered off and recrystallized three times from ethanol. The analytically pure S-(2-thienyl)-5-methoxy-thiosalicylic acid melts at 188–190°.

(ii) *6-methoxy - 4 - oxo - thieno[2,3-b][1]-benzothiopyran.*—A mixture of 129 g. of S-(2-thienyl)-5-methoxy-thiosalicylic acid and 1430 g. of polyphosphoric acid is heated while stirring at an oil bath temperature 110° during the course of 75 minutes. The reaction mixture is then poured onto a mixture of 3600 g. of ice and 3600 cc. of water, filtered off and the residue remaining after filtration with suction is stirred into 500 cc. of a 10% sodium hydroxide solution. After filtering with suction and drying the mixture is recrystallized 5 times from ethyl methyl ketone. The analytically pure 6-methoxy-4-oxo-thieno[2,3-b][1]-benzothiopyran melts at 158–160°.

(b) *6-methylmercapto-4-oxo-thieno[2,3-b][1]-benzothiopyran*

(i) *S - (2 - thienyl) - 5 - methylmercapto-thiosalicyclic acid.*—A mixture of 200 g. of the potassium salt of 2-mercapto-thiophene (free 2-mercapto-thiophene boiling point 166°), 366 g. of the potassium salt of 2-bromo-5-methylmercaptobenzoic acid (free acid melting point 142–144°), 25.5 g. of potassium iodide and 12.7 g. of copper bronze is heated to the boil at reflux with 1250 cc. of diethylene glycol monomethyl ether whilst stirring at an oil bath temperature of 220° during the course of 12 hours. After completion of the reaction the mixture is concentrated in a vacuum at an oil bath temperature of 150°. The evaporation residue is taken up in 1200 cc. of water, filtered and made acid to Congo red indicator with 550 cc. of a 10% hydrochloric acid solution. The precipitated substance is filtered off and recrystallized twice from chlorobenzene. The analytically pure S-(2-thienyl)-5-methylmercapto-thiosalicyclic acid melts at 173–175°. The 2-bromo-5-methylmercapto-benzoic acid (melting point 142–144°) was produced from 2-bromo-benzoic acid 5-sulphochloride (melting point 154–156°) by reduction with zinc chloride and hydrochloric acid to form 2-bromo-5-mercapto-benzoic acid (melting point 231–233°) and subsequent methylation with dimethyl sulphate. On the other hand the sulphochloride was obtained by sulphochlorination of 2-bromo-benzoic acid.

(ii) *6 - methylmercapto-4-oxo-thieno[2,3-b][1]-benzothiopyran.*—A mixture of 190 g. of S-(2-thienyl)-5-methylmercapto-thiosalicylic acid and 1980 g. of polyphosphoric acid is heated at an oil bath temperature of 110° for 75 minutes whilst stirring. The reaction mixture is then stirred into a mixture of 5000 g. of ice and 5000 cc. of water and then filtered off. The filter residue is subsequently stirred into 4000 cc. of a 10% sodium bicarbonate solution, filtered with suction and recrystallized after drying twice from ethylene chloride. The analytically pure 6-methylmercapto-4-oxo-thieno[2,3-b][1]-benzothiopyran melts at 169–171°.

The remaining compounds, which are new, may be produced in a manner analogous to that described for 6 - methoxy-4-oxo-thieno[2,3-b][1]-benzothiopyran and 6-methylmercapto - 4 - oxo - thieno[2,3-b][1]-benzothiopyran.

Conversion of the basic thioxanthenes so produced to acid addition salts is accomplished by admixture with one equivalent of an inorganic or strong organic acid, the anionic portions of which conform to Q as hereinabove set forth.

The following examples describe in detail compounds illustrative to the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples which have been given hereinbefore as well as those which are given hereinafter, temperatures are given in degrees centigrade and relative amounts of materials in parts by weight, except as otherwise noted.

The present invention also includes pharmaceutical compositions containing, in addition to a pharmaceutically acceptable, non-toxic, inert carrier, a therapeutically effective amount of a Compound I, or an acid addition salt thereof.

Suitable dosages have been found to be of the order of approximately 100 mg. to 500 mg. per day.

EXAMPLE 1. — 4-(1'-METHYL-PIPERIDYLIDENE-4')-THIENO[2,3-b][1]-BENZOTHIAPYRAN (a) *4-hydroxy-4-(1'-methyl-piperidyl-4')-thieno[2,3-b][1]-benzothiapyran.*—5.0 g. of magnesium shavings are covered with part of a total of 80 cc. of tetrahydrofuran in a well dried apparatus and are activated with an iodine crystal and a few drops of ethylene bromide. Subsequently 27.6 g. of N-methyl-4-chloropiperidine are added dropwise together with the remaining tetrahydrofuran at an oil bath temperature of 65° at such a rate that the reaction remains continuous. Subsequently the mixture is stirred for a further hour at an oil bath temperature of 100° and the oil bath temperature is then brought to 45°, a total of 30.0 g. of 4-oxo-thieno[2,3-b][1]-benzothiapyran (melting point 157–158°) are added portionwise during the course of 1½ hours at an internal temperature of 40° and subsequently left to react for a further hour at an oil bath temperature of 65°. After cooling the organo-magnesium compound is decomposed by stirring in a mixture of 27 g. of ammonium chloride, 110 cc. of water and 110 g. of ice. The crystalline substance separating is filtered off, washed and dried. After recrystalizing twice from ethyl acetate the analytically pure 4-hydroxy-4-(1'-methyl-piperidyl-4') - thieno[2,3-b][1]-benzothiapyran having a constant melting point of 188–190° results.

*Tartrate.*—A hot solution of 3.4 g. of the free base in 50 cc. of ethyl acetate and 5 cc. of chloroform is poured into a solution of 1.69 g. of tartaric acid in 260 cc. of ethyl acetate at 20° whilst shaking well. The resulting, analytically pure 4-hydroxy-4-(1'-methyl-piperidyl - 4') thieno[2,3-b][1]-benzothiapyran tartarte hydrate has a melting point of 120–125° (foam formation) after sintering from 75°.

(b) *4-(1'-methylpiperidylidene-4') - thieno[2,3-b][1]-benzothiapyran.*—5.0 g. of 4-hydroxy-4-(1'-methyl-piperidyl-4')-thieno[2,3-b][1]-benzothiapyran are heated to the boil with 26 cc. of phosphorus oxychloride during the course of one hour. The major portion of the phosphorus oxychloride is subsequently distilled off in a partial vacuum and the residue poured onto 150 cc. of ice water. By the addition of approximately 40 cc. of a concentrated sodium hydroxide solution, the mixture is made alkaline to phenolphthalein indicator and the separated base is shaken with a total of 100 cc. of chloroform. After concentration of the solvent, the evaporation residue is dissolved in 50 cc. of benzene for the purposes of purification, 25 g. of aluminum oxide are added and the mixture stirred well for 1 hour. The aluminum oxide is removed by filtration and the filtrate concentrated at reduced pressure. The required free base is obtained as an oil which could not be made to crystallize.

*Maleate.*—For this purpose 2.8 g. of the pre-purifed base are dissolved together with 1.14 g. of maleic acid in 14 cc. of boiling absolute ethanol and left to crystalize. After recrystallizing twice from absolute ethanol, the analytically pure 4-(1'-methyl-piperidylidene-4') - thieno[2,3-b][1]-benzothiapyran maleate having a melting point of 150–152° results.

EXAMPLE 2.—4-[3'-(1"-METHYL-PIPERAZYL - 4")-PROPYLIDENE-1'] - THIENO[2,3-b][1] - BENZOTHIOPYRAN (a) *4-hydroxy-4-[3'-(1"-methyl-piperazyl-4") - propyl-1']thieno[2,3-b][1]-benzothiopyran.* — 60.7 g. of 3-(1'-methyl-piperazyl-4')-1-propyl chloride (boiling point 95–97°/10 mm. of Hg) are condensed with 50.0 g. of 4-oxo-thieno[2,3-b][1]-benzothiopyran (melting point 157–158°) in a manner analogous to that described in Example 1. After the hydrolytic decomposition the separated substance is taken up in a total of 400 cc. of chloroform, the chloroform extract washed with 100 cc. of water, dried over potash, filtered and concentrated. By crystallizing the evaporation residue twice from acetone the analytically pure, crystalline 4-hydroxy-4-[3'-(1"-methyl-piperazyl-4")-propyl-1']thieno[2,3-b][1] - benzothiopyran having a melting point of 128–130° results.

(b) *4-[3'-(1"-methyl-piperazyl-4")-propylidene - 1']-thieno[2,3-b][1]benzothiopyran.*—30.0 g. of 4-hydroxy-4-[3'-(1"-methyl-piperazyl-4") - propyl - 1']thieno[2,3-b][1]-benzothiopyran are boiled at reflux with 35.5 cc. of acetic anhydride and 2.5 g. of anhydrous sodium acetate during the course of 5 hours at an oil bath temperature of 170°. The major portion of the acetic anhydride is subsequently distilled off in a partial vacuum and the evaporation residue poured onto 200 g. of ice. By the addition of approximately 30 cc. of a concentrated sodium hydroxide solution the mixture is made alkaline to phenolphthalein indicator and the separated base is extracted with 300 cc. of chloroform. After evaporation of the solvent the residue is dissolved in 100 cc. of benzene for the purpose of further purification and chromatographed on 900 g. of aluminum oxide. The first 450 cc. of the benzene eluate are rejected and the next 1000 cc. of benzene are concentrated; the required free base is obtained as an oil which could not be made to crystallize.

*Dimaleate.*—14.6 g. of base are dissolved in 50 cc. of absolute ethanol and poured into a hot solution of 10.4 g. of maleic acid in 100 cc. of absolute ethanol. After crystallizing the salt from 1000 cc. of a 90% methanol solution, the analytically pure 4-[3'-(1"-methyl-piperazyl-4")-propylidene-1']-thieno[2,3-b][1] - benzothiopyran dimaleate having a melting point of 180–182° (decomposition) results.

EXAMPLE 3.—6 - METHYLMERCAPTO - 4 - [2'-(N - METHYL - PIPERIDYL - 2") - ETHYLIDENE-1'] - THIENO[2,3 - b][1] - BENZOTHIOPYRAN 23.12 g. of crude 6-methylmercapto-4-hydroxy-4-[2'-(N - methyl - piperidyl - 2") - ethyl - 1'] - thieno[2,3-b][1]-benzothiopyran [produced as in Example 2(a)] are boiled at reflux with 25.1 cc. of acetic anhydride and 2.0 g. of anhydrous sodium acetate for 5 hours at an oil bath temperature of 170°. The major portion of the acetic anhydride is subsequently distilled off in a partial vacuum and the evaporation residue poured onto 200 g. of ice. By the addition of approximately 25 cc. of a concentrated sodium hydroxide solution the mixture is made alkaline to phenolphthalein indicator and the separated base extracted with a total of 250 cc. of chloroform. After evaporation of the solvent, the residue is chromatographed on aluminium oxide for the purpose of further purification and separation into its isomer forms. 19.19 g. of base are dissolved in 75 cc. of benzene and chromatographed on 580 g. of aluminium oxide. The first 500 cc. of benzene eluate are discarded. The second 500 cc. of benzene solution are concentrated and used for the isolation of the α isomer. A further 500 cc. of benzene eluate are discarded and the next 1250 cc. of benzene + 1% of methanol, as well as the next 500 cc. of benzene + 5% of methanol eluate are concentrated together and used for the isolation of the β isomer; the required free base is obtained as an oil which could not be made to crystallize.

*α isomer.*—The evaporation residue of the second benzene eluate is dissolved in 35 cc. of absolute boiling ethanol together with 2.16 g. of maleic acid and then cooled. After crystallizing the resulting salt 4 times from absolute ethanol the pure 6-methylmercapto-4-[2'-(N-methyl - piperidyl - 2") - ethylidene - 1'] - thieno[2,3-b][1]-benzothiopyran-maleate (the α isomer) having a melting point of 146–148° results.

*β isomer.*—The evaporation residues of benzene + 1% methanol and the benzene + 5% methanol eluates are dissolved in 25 cc. of absolute ethanol together with 0.70 g. of fumaric acid and then cooled. After crystallizing the salt twice from absolute ethanol the pure 6-methylmercapto - 4 - [2' - (N - methyl - piperidyl - 2") - ethylidene - 1'] - thieno[2,3 - b][1] - benzothiopyran semifumarate (β isomer) having a melting point of 173–175° results.

EXAMPLE 4.—4 - [2' - (N - METHYL - PIPERIDYL-2") - ETHYLIDENE - 1'] - THIENO[2,3 - b][1]-BENZOTHIOPYRAN 46.02 g. of 4-hydroxy-4-[2'-(N-methyl-piperidyl-2")-ethyl-1']-thieno[2,3-b][1]-benzothiopyran [melting point 111–113°, produced as in Example 1(a)] are boiled at reflux with 55.6 cc. of acetic anhydride and 3.6 g. of anhydrous sodium acetate during the course of 5 hours at an oil bath temperature of 170°. The major portion of the acetic anhydride is subsequently distilled off in a partial vacuum and the residue poured onto 200 cc. of ice water. The mixture is made alkaline to phenolphthalein indicator by the addition of approximately 30 cc. of a concentrated sodium hydroxide solution and the separated base is extracted with a total of 450 cc. of chloroform. After concentration of the solvent the evaporation residue is dissolved in 300 cc. of a 5% aqueous tartaric acid solution for the purpose of purification, the small quantity of insoluble compound filtered off and the filtrate made alkaline to phenolphthalein indicator with 25 cc. of a concentrated sodium hydroxide solution. The separated oily base is extracted with 200 cc. of benzene, the benzene extract washed with 50 cc. of water and concentrated in a partial vacuum. 15.0 g. of the evaporation residue are dissolved in 45 cc. of benzene and chromatographed on 450 g. of aluminium oxide for the purpose of further purification. The first 400 cc. of benzene eluate are discarded and the following 750 cc. of benzene are concentrated; the required free base is obtained as an oil which could not be made to crystallize.

*Fumarate.*—8.17 g. of the evaporation residue are dissolved in 40 cc. of boiling absolute ethanol together with 3.04 g. of fumaric acid and subsequently cooled. After recrystallization from absolute ethanol the crystalline, analytically pure 4-[2'-(N-methyl-piperidyl-2")-ethylidene-1']-thieno[2,3-b][1]-benzothiopyran fumarate having a melting point of 130–132°, sintering at 125°, results.

EXAMPLE 5.—4 - (3' - DIMETHYLAMINO - PROPYLIDENE - 1') - THIENO[2,3 - b][1] - BENZOTHIOPYRAN 25.0 g. of 4-hydroxy-4-(3'-dimethylamino-propyl-1')-thieno[2,3-b][1]-benzothiopyran [melting point 105–107°, produced as in Example 1(a)] are heated to the boil together with 135 cc. of phosphorus oxychloride during the course of 1 hour at an oil bath temperature of 120°. The major portion of the phosphorus oxychloride is subsequently distilled off in a partial vacuum and the residue poured onto 700 cc. of ice water. By the addition of approximately 100 cc. of a concentrated sodium hydroxide solution, the mixture is made alkaline to phenolphthalein indicator and the separated base is shaken with a total of 400 cc. of chloroform. After concentration of the solvent, the evaporation residue is dissolved in 150 cc. of benzene, chromatographed on 750 g. of aluminium oxide and eluted in 300 cc. portions. Two benzene fractions and 3 benzene + 0.5% methanol fractions are discarded. The 8 subsequent fractions, consisting of benzene + 1% methanol are concentrated together; the required free base is obtained as an oil which could not be made to crystallize.

*Tartrate.*—A solution of 3.12 g. of the evaporation residue in 100 cc. of ethyl acetate is added at room temperature to a solution of 1.71 g. of tartaric acid in 250 cc. of ethyl acetate at approximately 20° whilst stirring well. The resulting, analytically pure 4-(3′-dimethylamino-propylidene-1′)-thieno[2,3-b][1]-benzothiopyran tartrate hydrate has a melting point of 135° (foam) after sintering from 110°.

EXAMPLE 6.—6-CHLORO-4-(3′-DIMETHYLAMINO-PROPYLIDENE - 1′)THIENO[2,3 - b][1] - BENZOTHIOPYRAN 15.0 g. of 6-chloro-4-hydroxy-4-(3′-dimethylamino-propyl - 1′) - thieno[2,3-b][1] - benzothiopyran [melting point 134–136°, produced according to Example 1(a)] are heated to dryness in a water jet vacuum during the course of ½ hour at an oil bath temperature of 160°. After this time the dehydration is completed, the residue is dissolved in 50 cc. of benzene, chromatographed on 420 g. of aluminum oxide and aluted in 150 cc. portions. The first 5 benzene fractions are discarded and the following 4 concentrated together; the required free base is obtained as an oil which could not be made to crystallize.

*Maleate.*—11.76 g. of the evaporation residue are dissolved in 60 cc. of boiling acetone together with 4.46 g. of maleic acid, subsequently cooled and filtered. After recrystallizing once from ethyl acetate the analytically pure 6 - chloro - 4-(3′-dimethylamino-propylidene-1′)thieno[2,3-b][1]-benzothiopyran maleate having a melting point of 114–116° results.

In the following tables further examples are given; the procedure used was analogous to the procedure of the example shown in the second column; the compounds I in the form of the free bases are all obtained as oils which could not be made to crystallize.

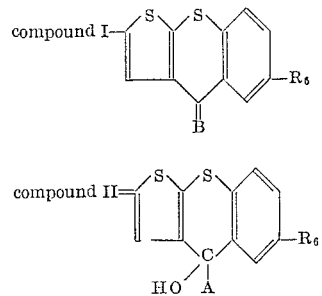

TABLE

| Example | Procedure of example used | B for cpd. I, A for cpd. II | $R_6$ | Salt or free base | Melting point in degrees Centigrade |
|---|---|---|---|---|---|
| 7 { cpd. I | 1 | =CHCH₂—N(piperidine)—CH₃ | Cl | Tartrate | 105–110 |
| 7 { cpd. II | 1a | —CH₂CH₂—N(piperidine)—CH₃ | Cl | Free base | 158–160 |
| 8 { cpd. I | 2 | =CH—(N-methylpiperidine) | H | Maleate | 165–167 |
| 8 { cpd. II | 1a | —CH₂—(N-methylpiperidine) | H | Free base | 176–178 |
| 9 { cpd. I | 2 | =CHCH₂—N(pyrrolidine)—CH₃ | H | Maleate | 105–107 |
| 9 { cpd. II | 1a | —CH₂—CH₂—N(pyrrolidine)—CH₃ | H | Free base | 120–122 |
| 10 { cpd. I | 2 | =CHCH₂CH₂N(piperidine) | H | Chlorohydrate | 216–218 |
| 10 { cpd. II | 1a | —CH₂CH₂CH₂N(piperidine) | H | Free base | 130–032 |

TABLE—Continued

| Example | Procedure of example used | B for cpd. I, A for cpd. II | R₅ | Salt or free base | Melting point in degrees Centigrade |
|---|---|---|---|---|---|
| 11 { cpd. I | 2 | =CHCH₂CH₂NO | H | Chlorohydrate. | 218–220 |
| 11 { cpd. II | 1a | —CH₂CH₂CH₂NO | H | Free base | 140–142 |
| 12 { cpd. I | 2 | =CHCH₂CH₂N(CH₃)₂ | SCH₃ | Fumarate | 135–137 |
| 12 { cpd. II | 1a | —CH₂CH₂CH₂N(CH₃)₂ | SCH₃ | Free base | 121–123 |
| 13 { cpd. I | 2 | =CHCH₂—, N-CH₃ | OCH₃ | Tartrate | 105–110 |
| 13 { cpd. II | 2a | —CH₂—CH₂—, N-CH₃ | OCH₃ | Tartrate | 95–100 |
| 14 { cpd. I | 6 | =CHCHCH₂N(CH₃)₂, CH₃ | OCH₃ | Maleate | 149–151 |
| 14 { cpd. II | 2a | —CH₂CHCH₂N(CH₃)₂, CH₃ | OCH₃ | Free base | -------- |

EXAMPLE 15.—6-CHLORO-4-(1'-METHYL-PEPERIDYLIDENE-4')-THIENO[2,3-B][1] - BENZOTHIAPYRAN (a) *6-chloro - 4 - hydroxy-4-(1'-methyl-piperidyl-4')-thieno[2,3-b][1]-benzothiapyran.*—433 g. of magnesium shavings are covered with a part of a total of 70 cc. of tetrahydrofuran in a well dried apparatus and are activated with an iodine crystal and a few drops of ethylene bromide. Subsequently 23.8 g. of N-methyl-4-chloropiperidine are added dropwise together with the remaining tetrahydrofuran at an oil bath temperature of 65° at such a rate that the reaction remains continuous. Subsequently the mixture is stirred for a further one and a half hours at an oil bath temperature of 100° and the oil bath temperature is then brought to 45°, a total of 30.0 g. of 6-chloro-4-oxo-thieno[2,3,-b][1]-benzothiapyran (melting point 180–182°) are added portionwise during the course of one and a half hours at an internal temperature of 40° and subsequently left to react for a further hour at an oil bath temperature of 65°. After cooling the organomagnesium compound is decomposed by stirring in a mixture of 45 g. of ammonium chloride, 200 cc. of water and 200 g. of ice. The resulting compound is taken up in a total of 400 cc. of chloroform, the chloroform extract washed with 100 cc. of water dried over potash, filtered and concentrated. Upon crystallising the evaporation residue from a 15-fold quantity of ethyl acetate, the 6-chloro-4-hydroxy-4-(1'-methyl-piperidyl-4')-thieno[2,3-b][1]-benzothiapyran having a melting point of 217–219° results.

(b) *6-chloro - 4 - (1'-methyl-piperidylidene-4')thieno[2,3-b][1]-benzothiapyran.*—11.95 g. of 6-chloro-4-hydroxy - 4 - (1' - methyl-piperidyl - 4')-thieno[2,3-b][1]-benzothiapyran are heated to the boil at reflux together with 14.4 cc. of acetanhydride and 1.5 g. of anhydrous sodium acetate during the course of 5 hours. The major portion of the acetanhydride is subsequently distilled off in a partial vacuum and the evaporation residue poured onto 200 g. of ice. The mixture is made alkaline to phenolphthalein indicator while the addition of approximately 30 cc. of concentrated sodium hydroxide and the separated base is extracted with a total of 300 cc. of chloroform. After evaporation of the solvent the residue is dissolved in 100 cc. of benzene and adsorbed on to 340 g. of aluminium oxide for the purpose of further purification. The first 600 cc. of benzene eluate are discarded and the following 900 cc. of benzene eluate are concentrated separately.

*Maleate.*—5.6 g. of the chromatographed base are dissolved in 10 cc. of absolute ethanol and 2.05 g. of maleic acid in 18 cc. of absolute ethanol are added thereto. The mixture is cooled, filtered off with suction and crystallised from 100 cc. of boiling absolute ethanol. The resulting compound has a melting point of 200–202°.

What is claimed is:
1. A compound of the formula:

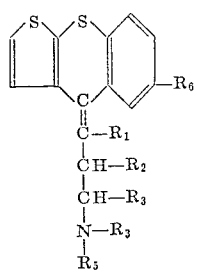

wherein $R_1$, $R_2$, $R_3$, $R_4$ and $R_5$ are selected from the group consisting of hydrogen and alkyl of 1 to 4 carbon atoms, $R_4$ and $R_5$ can form together a ring selected from the group consisting of pyrrolidine, piperidine, lower-4-alkyl-piperazine and morpholine, $R_4$ can form together with $R_1$, $R_2$, $R_3$ a ring selected from the group consisting of pyrrolidine and piperidine and $R_6$ is a member selected from the group consisting of hydrogen, chlorine, lower alkoxy and lower alkylmercapto.

2. A compound of the formula

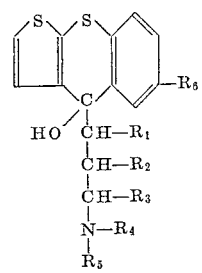

wherein $R_1$, $R_2$, $R_3$, $R_4$ and $R_5$ are selected from the group consisting of hydrogen and alkyl of 1 to 4 carbon atoms, $R_4$ and $R_5$ can form together a ring selected from the group consisting of pyrrolidine, piperidine, 4-lower-alkyl-piperazine and morpholine, $R_4$ can form together with $R_1$, $R_2$, $R_3$ a ring selected from the group consisting of pyrrolidine and piperidine, and $R_6$ is a member selected from the group consisting of hydrogen, chlorine, lower alkoxy, and lower alkylmercapto.

3. A compound of the formula

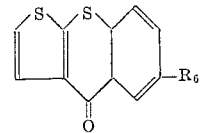

wherein $R_6$ is a member selected from the class consisting of hydrogen, chlorine, lower alkoxy and lower alkylmercapto.

4. 4-(1'-methyl-piperidylidene-4') - thieno[2,3-b]-[1]-benzothiopyran.
5. 4-[3'-(1'' - methyl-piperazyl-4'') - propylidene-1']-thieno[2,3-b][1]-benzothiopyran.
6. 4-[2'-(N - methyl - piperidyl - 2'')-ethylidene-1']-thieno[2,3-b][1]-benzothiopyran.
7. 4-(3' - dimethylamino - propylidene - 1') - thieno-[2,3-b][1]-benzothiopyran.
8. 6-chloro - 4 - (3' - dimethylamino-propylidene-1')-thieno[2,3-b][1]-benzothiopyran.
9. 4-[3'-(piperidyl-1'') - propylidene-1']-thieno[2,3-b][1]-benzothiopyran.
10. 4-[3'-(morpholinyl - 4'') - propylidene-1']-thieno-[2,3-b][1]-benzothiopyran.
11. 4-hydroxy - 4 - (1' - methyl-piperidyl-4')-thieno-[2,3-b][1]-benzothiopyran.
12. 4-hydroxy-4-[3'-(1'' - methyl-piperazyl-4'')-propyl-1']-thieno[2,3-b][1]-benzothiopyran.
13. 4-hydroxy - 4 - (3' - dimethylamino-propyl-1')-thieno[2,3-b][1]-benzothiopyran.
14. 6-chloro-4-hydroxy-4-(3' - dimethylamino-propyl-1')-thieno[2,3-b][1]-benzothiopyran.
15. 6-chloro - 4 - (1'-methyl-piperidylidene-4')-thieno-[2,3-b][1]-benzothiopyran.
16. 4-[2' - (N - methyl-pyrrolidyl-2'')-ethylidene-1']-thieno-[2,3-b][1]-benzothiopyran.
17. 6-chloro-4-[2'-(N-methyl-piperidyl-2') - ethylidene-1']-thieno[2,3-b][1]-benzothiopyran.

No references cited.

JOSE TOVAR, *Assistant Examiner.*
ALEX MAZEL, *Primary Examiner.*